(12) United States Patent
Bomatter et al.

(10) Patent No.: US 10,337,178 B2
(45) Date of Patent: *Jul. 2, 2019

(54) SINK

(71) Applicant: Franke Technology and Trademark Ltd, Hergiswil (CH)

(72) Inventors: Christian W. Bomatter, Willer (FR); Rolf Neeser, Reidermoos (CH); Tobias Maier, Langenzenn (DE)

(73) Assignee: Franke Technology and Trademark Ltd, Hergiswil (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/662,941

(22) Filed: Jul. 28, 2017

(65) Prior Publication Data

US 2018/0030705 A1    Feb. 1, 2018

Related U.S. Application Data

(60) Provisional application No. 62/372,961, filed on Aug. 10, 2016.

(30) Foreign Application Priority Data

Jul. 28, 2016   (EP) .................................... 16181676

(51) Int. Cl.
*A47J 47/20*     (2019.01)
*E03C 1/186*    (2019.01)
(Continued)

(52) U.S. Cl.
CPC ............... *E03C 1/186* (2013.01); *A47J 47/20* (2013.01); *F16J 15/10* (2013.01); *E03C 1/18* (2013.01)

(58) Field of Classification Search
CPC .......... E03C 1/18; E03C 1/186; A47J 47/005; A47K 3/14
(Continued)

(56) References Cited

U.S. PATENT DOCUMENTS

| 495,390 | A | 4/1893 | Brueck |
| 668,322 | A | 2/1901 | Stephen |

(Continued)

FOREIGN PATENT DOCUMENTS

| CN | 101716066 | 6/2010 |
| CN | 103510590 | 1/2014 |

(Continued)

*Primary Examiner* — Erin Deery
(74) *Attorney, Agent, or Firm* — Volpe and Koenig, P.C.

(57) ABSTRACT

A sink having at least one bowl with a bottom wall and a circumferential side wall, with an outlet opening in the bottom wall. First and second rectilinear grooves are provided in the side wall that extend toward the bottom wall. A plate-shaped divider fits into the first and second grooves in watertight manner. The divider has a peripheral edge with first and second portions that engage the first and second grooves, respectively, and a third portion located between the first and second portions contacts the bottom wall. A gasket is arranged on the edge in the first through third portions having three seal beads. First and second seal beads are arranged on first and second opposite lateral side of the edge of the divider, respectively, and a third seal bead is arranged on the peripheral edge between the first and second seal beads.

16 Claims, 6 Drawing Sheets

(51) Int. Cl.
*F16J 15/10* (2006.01)
*E03C 1/18* (2006.01)

(58) Field of Classification Search
USPC .......... 4/541, 654, 656, 657, 619, 639, 642;
277/644, 647, 648, 395, 491, 530;
220/532, 533, 529; D23/303, 284, 308
See application file for complete search history.

(56) References Cited

U.S. PATENT DOCUMENTS

| | | | | |
|---|---|---|---|---|
| 1,817,330 A | * | 8/1931 | Wilson, Jr. | E03C 1/186 4/514 |
| 2,109,089 A | * | 2/1938 | Moyes | E03C 1/186 4/514 |
| 4,333,188 A | * | 6/1982 | Jensen | A47K 1/04 4/505 |
| 4,443,018 A | * | 4/1984 | Samol | F24C 15/021 277/632 |
| 5,184,358 A | * | 2/1993 | Gruidel | A47K 3/006 277/647 |
| 5,423,451 A | * | 6/1995 | Snyder | A47J 47/005 206/216 |
| D544,587 S | * | 6/2007 | Bouhassira | D23/308 |
| D548,311 S | | 8/2007 | Mahon | |
| 7,721,362 B2 | * | 5/2010 | Martin | E03C 1/186 220/529 |
| D630,478 S | * | 1/2011 | Bell | D7/698 |
| 8,635,718 B1 | | 1/2014 | Giagni, Sr. et al. | |
| 9,314,143 B2 | * | 4/2016 | Bensussan | A47L 13/51 |
| 2002/0184704 A1 | * | 12/2002 | Cawthon | A22C 25/025 4/619 |
| 2008/0148475 A1 | * | 6/2008 | Lin | A47L 17/02 4/631 |
| 2009/0049596 A1 | * | 2/2009 | Ferris | E03C 1/186 4/514 |
| 2015/0128339 A1 | | 5/2015 | Warner | |

FOREIGN PATENT DOCUMENTS

| | | | | |
|---|---|---|---|---|
| DE | 4024093 | | 1/1992 | |
| GB | 1266295 A | * | 3/1972 | ............ E03C 1/186 |
| GB | 2484143 A | * | 4/2012 | ............ A47J 36/04 |
| WO | 2013126482 | | 8/2013 | |

* cited by examiner

SINK

INCORPORATION BY REFERENCE

The following documents are incorporated herein by reference as if fully set forth: U.S. Provisional Patent Application No. 62/372,961, filed Aug. 10, 2016, and European Patent Application No. 16181676.4, filed Jul. 28, 2016.

BACKGROUND

The application relates to a sink, in particular kitchen sink. The sink comprises at least one bowl with a bottom wall and a circumferential side wall and at least one outlet opening located in said bottom wall.

It is known in the art to provide such sinks with a removable divider element (or divider), which can be installed inside said bowl in order to subdivide said bowl into two separate bowls, if necessary.

Sinks of that kind are disclosed, e.g., in U.S. Pat. No. 8,635,718 B1, US 2015/0128339 A1, U.S. Pat. No. 7,721,362 B2, CN 103510590 A or CN 101716066 A. Sinks of the above-mentioned kind may comprise a first rectilinear groove in said side wall, said first groove extending toward said bottom wall, and a second rectilinear groove in said side wall opposite said first groove, said second groove extending toward said bottom wall. Said grooves are devised for inserting a generally plate-like divider, which can be fit into said first and second grooves in watertight manner. Said divider generally has a peripheral edge, a first portion of which is adapted to engage said first groove, a second portion of which is adapted to engage said second groove, and a third portion of which, located between said first and second portions, is adapted to come into contact with said bottom wall. At least one gasket can be arranged on said edge in said first through third portions thereof in order to provide a watertight seal.

SUMMARY

It is the object of the present invention to provide a sink of the above-described type, which can be divided into two separate bowls by a divider, which sink can be produced without excessive cost expenditure, while providing a secure watertight seal between the sink wall and said divider, even for sinks which are produced by deep drawing from a relatively thin sheet metal material.

This object is achieved by means of a sink with one or more features of the invention. Preferred embodiments of the inventive sink are defined below and in the claims.

According to the present invention, a sink, in particular kitchen sink, comprises: at least one bowl with a bottom wall and a circumferential side wall; at least one outlet opening located in said bottom wall; a first rectilinear groove in said side wall, said first groove extending toward said bottom wall; a second rectilinear groove in said side wall opposite said first groove, said second groove extending toward said bottom wall; a plate-like divider for fitting into said first and second grooves in watertight manner, said divider having a peripheral edge, a first portion of which is adapted to engage said first groove, a second portion of which is adapted to engage said second groove, and a third portion of which, located between said first and second portions, is adapted to come into contact with said bottom wall; at least one gasket arranged on said edge in said first through third portions thereof, said gasket comprising three seal beads, a first seal bead being arranged on a first lateral side of said edge of said divider in said first through third portions thereof, a second seal bead being arranged on a second lateral side of said edge of said divider in said first through third portions thereof, said second lateral side facing away from said first lateral side, and a third seal bead being arranged on said peripheral edge between said first and second seal beads, at least in said third portion of said peripheral edge.

As known from the prior art, the sink according to the present invention comprises at least one bowl, which bowl has a bottom wall and a circumferential sidewall. At least one outlet opening is located in said bottom wall of the bowl. First and second rectilinear grooves are arranged in said side wall, which grooves extend toward said bottom wall for fitting a plate-like divider in watertight manner. Said divider has a peripheral edge, a first portion of which is that to engage said first groove, a second portion of which is adapted to engage the second groove and a third portion of which is adapted to come into contact with said bottom wall. Said third portion is located between said first and second portions. Furthermore, the divider has at least one gasket arranged on said edge in said first through third portions thereof.

In order to enhance said watertight seal, according to the invention said gasket comprises three individual seal beads, a first seal bead being arranged on a first lateral side of said edge of the divider in said first through third portions thereof, a second seal bead being arranged on a second lateral side of said edge of said divider in said first through third portions thereof, said second lateral side facing away from said first lateral side, and a third seal bead being arranged on said peripheral edge between said first and second seal beads. In this way, said first seal bead will come into contact with a first side wall of said first and second grooves, whereas said second seal bead will come into contact with an opposite side wall of said first and second grooves. Said third seal bead, which is arranged on said peripheral edge of the divider between said first and second seal beads, at least in said third portion of said peripheral edge, will come into contact with a bottom wall of said first and second grooves as well as with the bottom wall of the sink bowl. In an alternative configuration of said gasket, said first and second seal beads need not be present in said third portion of the divider, which third portion is adapted to come into contact with said bottom wall of the sink.

In an alternative embodiment, said gasket need not comprise said third seal bead in said first and second edge portions of the divider, which first and second edge portions are intended to be inserted in said first and second grooves.

In another advantageous embodiment of the inventive sink, at least said third seal bead is of different shape than said first and second seal bead. Preferably, said third seal bead at least partially has the form of a triangular prism with its apex facing away from said peripheral edge, while preferably said first and second seal beads have a circular or oval cross section. In this way, said first and second seal beads are optimized for contacting the side walls of said first and second grooves, whereas said third seal bead is optimized for making water-tight contact with the bottom wall of said sink.

Preferably, for reasons of hygiene and durability as well as for further improving water-tightness, according to yet another embodiment of the sink according to the present invention, the gasket, preferably at least said third seal bead, can made of a silicone material or the like. The gasket can be applied by means of a robotic manipulator. It should have good adherence properties in respect of a material used for fabricating the divider.

For even further improving water-tightness, in yet another embodiment the divider can have a respective beveled surface on said first lateral side of said edge and on said second lateral side of said edge, said first seal bead and said second seal bead being arranged on said respective beveled surface. Said bevel surface can extend all around the peripheral edge of the divider, at least in said first to third portions thereof. Preferably, a cross section of said first and second grooves presents a shape which is complementary to a contour of said peripheral edge, including said beveled surfaces, if present.

For increasing the stability of the side wall, especially when inserting the divider, in order to avoid any deformation toward the outside, which might prevent formation of said watertight seal, especially for sinks made of deep drawn sheet metal material, in a preferred embodiment of the sink according to the invention, at least one first bead is arranged in said side wall in a vicinity of said first groove, which first bead extends essentially orthogonally with respect to said first groove. Furthermore, at least one second bead is arranged in said side wall in a vicinity of said second groove, which second bead extends essentially orthogonally with respect to said second groove. According to the invention, said first and second beads are located on a same side of the divider, when said divider is fitted into said first and second grooves. Furthermore, said first and second beads are located essentially at a same distance from an upper edge of said bowl and/or in a common horizontal plane in an installed state of the sink. This is equivalent to saying that said first and second beads lie or extend in a common plane.

Said first and second beads effectively increase the stability of the sink side wall, so that it will not deform during insertion of the divider, thus providing a solution for the object underlying the present invention in a highly cost-effective way.

According to a further embodiment of the sink according to the present invention, said sink comprises two first beads and two second beads in said side wall, which can be respectively located on opposing sides of the divider, when said divider is fitted into said first and second grooves. This configuration will further increase stability of the sink side wall, while creating a possibility for placing accessory items, such as a strainer or a cutting board, to be placed within said bowl while resting on said first and second bead—especially when said divider is not in place.

According to another embodiment of the sink according to the present invention, it may comprise two outlet openings in said bottom wall, respectively located on opposing sides of the divider, and said divider is fitted into said first and second grooves. In this way, by means of a divider, the sink bowl can be separated into two completely independent bowls, each having its bowl outlet opening for separately draining said bowl.

Preferably, according to a further embodiment of the sink according to the present invention, said divider can be made of a plastic or synthetic material, or of metal. This kind of divider would be sufficiently stable, cheap, light-weight and hygienic. Additionally, a divider of that kind could be used as a cutting or chopping board, thus providing increased flexibility of use.

In yet another further embodiment of the sink according to the present invention, said divider has two distinct sides, each side comprising a different material composition and/or a different color. In this way, for instance, the divider could be used as a cutting board for vegetable (one side) and for meat (other side), for reasons of hygiene.

In order to further increase flexibility of use, in yet another further embodiment of the inventive sink, the divider can comprise a knife sharpener.

In order to facilitate the use of the divider, in yet another further embodiment of the inventive sink, said divider can comprise a grip or a gripping hole or handle in the vicinity of a fourth portion of its peripheral edge, said fourth portion located opposite said third portion, i.e. at an upper edge of the divider, when in use.

For esthetic purposes and in order to promote easy installation, according to another embodiment of the inventive sink, it can be of an overall rectangular shape, preferably with rounded corners.

In yet a further embodiment of the sink according to the present invention, the sink bowl can taper toward said bottom wall, which implies corresponding tapering of the divider. This allows for easy insertion of the divider into said grooves, because any frictional contact between the divider and the sink wall will only occur during the very last stage of the insertion process. In this context, preferably said side wall including said first and second grooves is inclined by 2 to 3 degrees in the direction of a horizontal plane defined by the sink edge (or a worktop in which the sink is installed).

As already stated above, in yet another embodiment of the sink according to the present invention, said first and second beads are devised for supporting a sink accessory, preferably a cutting board or a strainer, while said sink preferably further comprises said accessory. In this way, the flexibility of use of the inventive sink can be increased further.

According to yet another further embodiment of the sink according to the present invention, said bottom wall has an elevated portion, said elevated portion extending between said first groove and said second groove, preferably over an entire distance between opposing sink side walls. Said elevated portion, an apex of which preferably is of flat or planar configuration, is intended for coming into contact with the divider gasket in said third portion thereof. This further enhances water-tightness of the divider seal and will contribute to guiding drainable fluid to the respective bottom wall outlet, if present. Furthermore, said elevation enhances stability of the sink bottom wall which further contributes to the quality of the watertight seal provided by the divider.

In a highly preferred embodiment of the inventive sink, said first groove and said second groove present a rectangular cross section, preferably a cross section in the form of an isosceles trapezoid, while said divider presents a complementary cross section, at least along its peripheral edge in said first and second portions. Applicant has found that such a configuration of the grooves and the divider further enhances the stability of the sink, while further increasing the quality of the watertight seal.

Finally, in yet another further embodiment of the inventive sink, said bowl can be of different shape and/or size on respective sides of said first and second grooves or on respective sides of the divider, when said divider is fitted into said first and second grooves. This further increases flexibility of use of the inventive sink.

BRIEF DESCRIPTION OF THE DRAWINGS

Additional features and advantages of the present invention will now be described with reference to the appended figures. Said figures show exemplary embodiments of a sink according to the present invention.

DETAILED DESCRIPTION OF THE PREFERRED EMBODIMENTS

Figure 1:
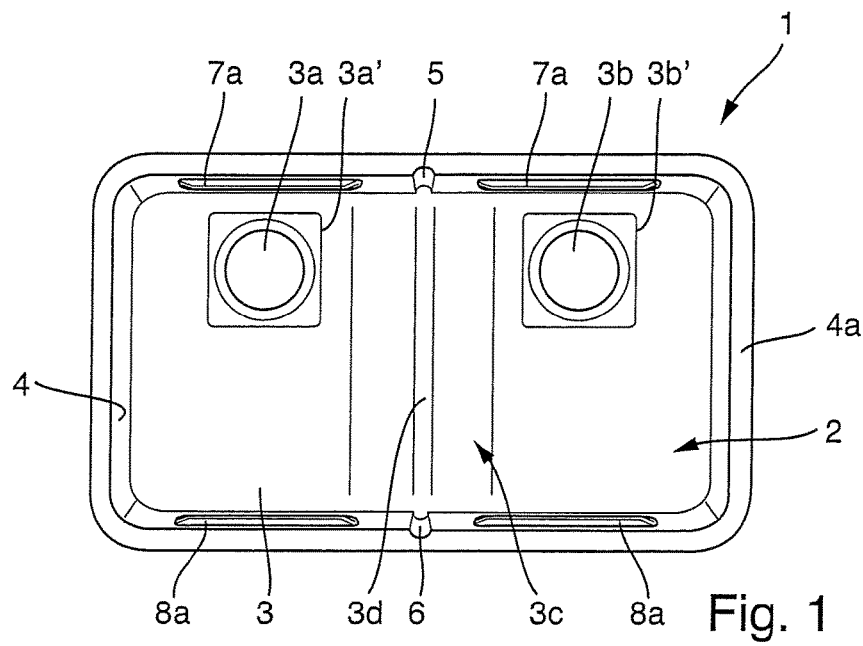
FIG. 1 is a plan view of a sink according to the present invention, without divider.
Figure 2:
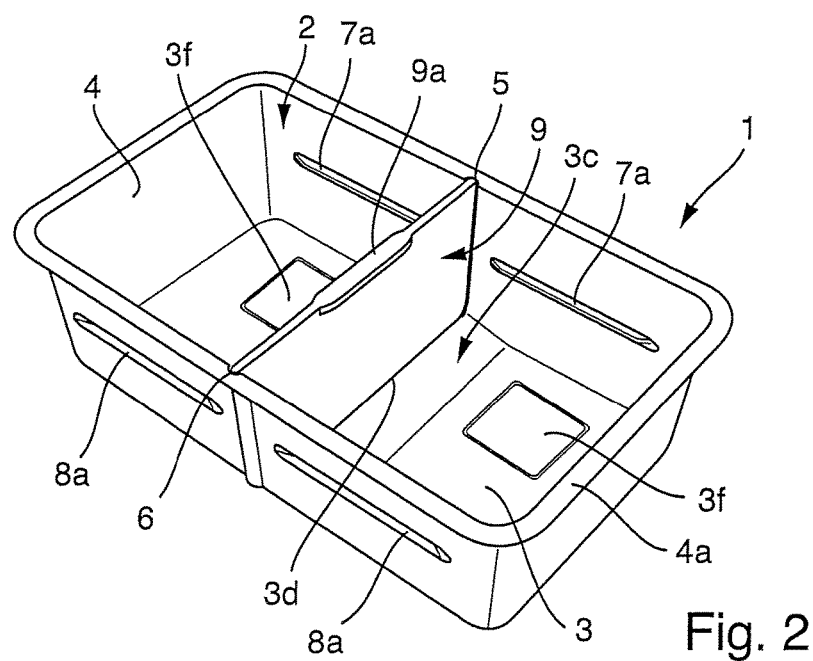
FIG. 2 is a perspective view of the sink of FIG. 1, with divider.

FIG. 1 is a plan view of a sink 1 according to the present invention, but without the divider (cf. FIG. 2). Sink 1, which is—without limitation—devised as a kitchen sink, comprises one bowl 2, which bowl 2 is delimited by a bottom wall 3 and a circumferential side wall 4. In said bottom wall 3, there are arranged two outlet openings 3a, 3b, which have a circular shape surrounded by a recess 3a', 3b' in the form of a square. Sink 1 further comprises a first rectilinear groove 5 in said side wall 4, which first groove 5 extends from an upper flange rim 4a of side wall 4 toward said bottom wall 3. Furthermore, sink 1 comprises a second rectilinear groove 6 in said side wall 4 opposite said first groove 5, which second groove 6 also extends from rim 4a toward bottom wall 3. Additionally, sink 1 comprises an elevation 3c of bottom wall 3, which elevation 3c takes the form of a triangular prism (in cross section) with flat apex 3d, which elevation 3c extends between said first groove 5 and said second groove 6.

Said first and second grooves 5, 6 are intended and adapted for insertion of a plate-like divider, which will be explained in more detail below with reference to FIG. 2.

Referring again to FIG. 1, sink 1 comprises a first bead 7a arranged in side wall 4 in a vicinity of said first groove 5, extending essentially orthogonally with respect to said first groove. Additionally, sink 1 comprises a second bead 8a arranged in side wall 4 in a vicinity of said second groove 6, extending essentially orthogonally with respect to said second groove 6. As shown in FIG. 1, said first bead 7a and said second bead 7b are located on a same side of the divider, as will become evident below with reference to FIG. 2. For the time being, this is equivalent to saying that bead 7a and bead 8a are located on the same side with reference to apex 3d of elevation 3c. Furthermore, said first and second beads 7a, 8a are located essentially at a same distance from the upper edge of bowl 2 (i.e., rim 4a) and/or in a common horizontal plane in an installed state of the sink (cf. FIGS. 8 and 9). In addition, it can be said that bead 7a, 8a are located essentially at a same distance from bottom wall 3.

FIG. 2 shows sink 1 of FIG. 1 with a divider 9 engaged in said grooves 5, 6 while at the same time making contact with bottom wall 3 at apex 3d of elevation 3c. At reference numeral 9a, divider 9 has a handle or grip for inserting or removing the divider 9.

As can be further gathered from FIG. 2, the above-mentioned outlet openings 3a, 3b (cf. FIG. 1) have been covered by means of strainer inserts or the like, denoted by reference numeral 3f.

It should be noted that in FIGS. 1 and 2, first and second beads 7a, 8a, respectively, are located on both sides of elevation 3c or divider 9, in each case at essentially the same distance from the upper edge (rim 4a) of bowl 2. These beads 7a, 8a effectively stabilize side wall 4 around said first and second grooves 5, 6, which can enhance the quality of a watertight seal provided by divider 9. Furthermore, beads 7a, 8a can be used as a support for an accessory item (or a plurality of accessory items) to be placed within sink bowl 2.

Figure 3:
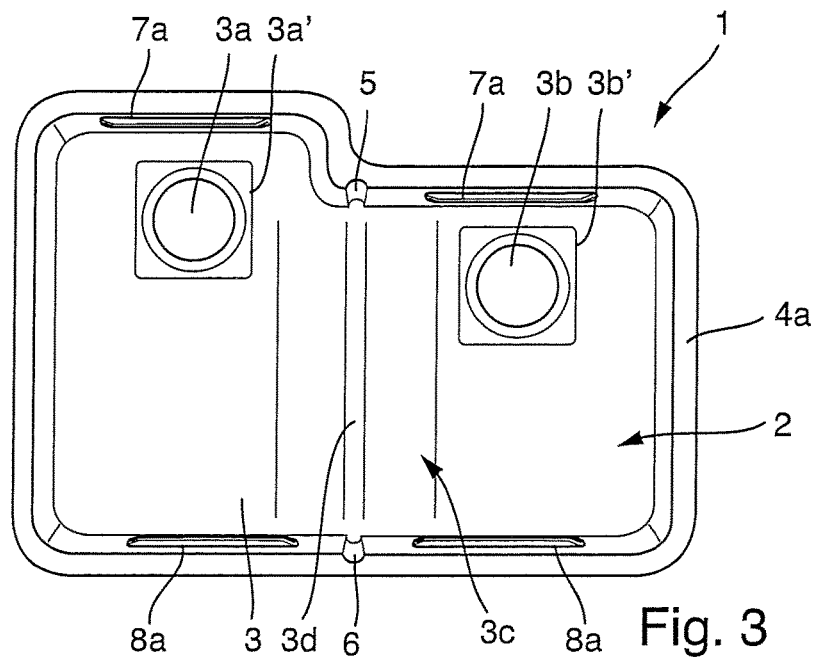
FIG. 3 is a plan view of another sink according to the present invention without divider.
Figure 4:
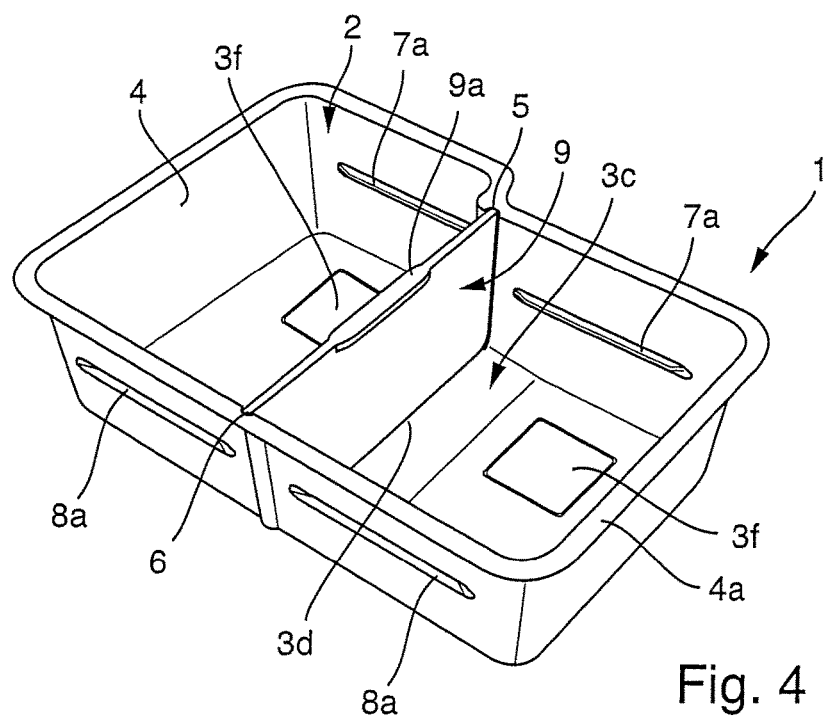
FIG. 4 is a perspective view of the sink of FIG. 3, with divider.

FIG. 3 and FIG. 4 show an alternative sink design, which sink 1 has an overall shape which (in plan view) differs from the rectangular form according to FIGS. 1 and 2. Referring to FIGS. 3 and 4, the bowl portion to the left of elevation 3c has different dimensions than a bowl portion to the right of elevation 3c. However, it should be noted that the present invention is by no means limited to the exemplary sink shapes of FIGS. 1, 2 and FIGS. 3, 4, respectively. A sink according to the present invention can take any form, including round (circular) forms and so-called free forms, which do not correspond to any regular geometrical shape. Apart from these differences, the sink of FIG. 3 and FIG. 4 corresponds to that of FIG. 1 and FIG. 2, so that any further discussion thereof can be omitted.

Figure 5:
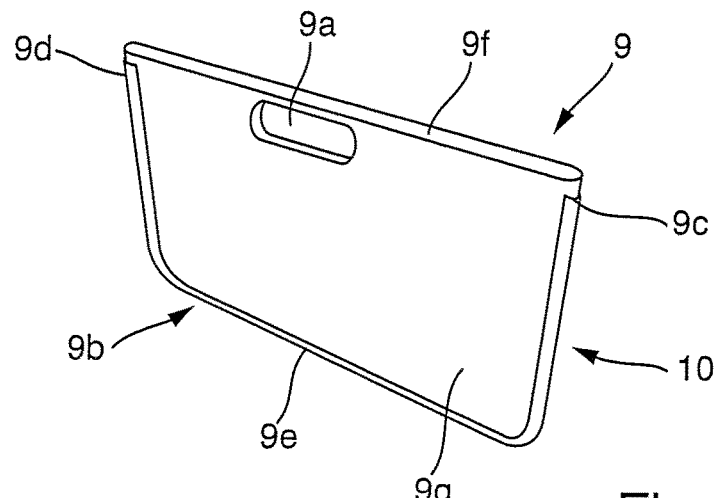
FIG. 5 is a perspective view of the divider, as comprised in an inventive sink.

FIG. 5 is a perspective view of a divider 9, as can be comprised in the present invention. Divider 9 is of overall plate-like shape and—in the embodiment of FIG. 5—has a gripping hole 9a for inserting and removing the divider 9. Divider 9 has a peripheral edge 9b, which is comprised of four portions: a first portion, as denoted by reference numeral 9c, which is intended and adapted to engage said first groove 5 (cf. FIGS. 1 through 4); a second portion 9d opposite said first portion 9c, which is intended and adapted to engage said second groove 6 (cf. FIGS. 1 through 4); a third portion 9e located between said first portion 9c and said second portion 9d, which third portion 9e is adapted to come into contact with said bottom wall 3 at elevation 3c (cf. FIGS. 1 through 4); and a fourth portion 9f, in a vicinity of which is provided said gripping hole 9a. Essentially all along said first through third portions 9c-9e, there is provided a gasket 10, preferably made of silicone, which is intended to provide said watertight seal between divider 9 and side wall 4 along said grooves 5, 6 and bottom wall 3 (elevation 3c) (cf. FIGS. 1 through 4). A preferred configuration of said gasket 10 will be explained below with reference to FIG. 7.

As can be further gathered from FIG. 5, divider 9—apart from its rounded corners—has the overall geometrical form of an isosceles trapezoid, with edge portions 9c, 9d being inclined toward each other so that each portion 9e is smaller (shorter) than edge portion 9f. Preferably, this corresponds to a configuration of sink 1, the side wall 4 of which tapers from said rim 4a toward said bottom wall 3b, preferably with an inclination of 2 through 3 degrees.

The preferred embodiment of divider 9 (cf. FIG. 5) may include different colourings on opposing sides 9g (other not shown) thereof, or using different materials for said opposing sides of divider 9.

Figure 6:
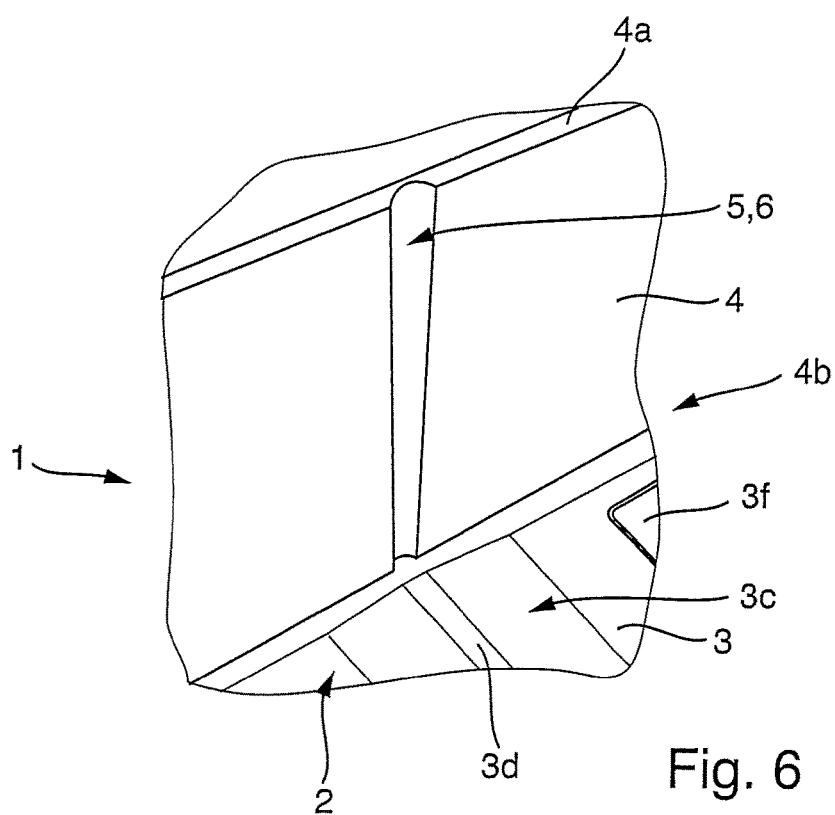
FIG. 6 is a detailed view, showing the sidewall of a sink according to the present invention.

FIG. 6 is a detailed perspective view of groove 5 or 6 in side wall 4 of a sink 1 according to the present invention. As can be seen from FIG. 6, grooves 5, 6, too, have a cross section that corresponds to an isosceles trapezoid, which will be explained below with reference to FIG. 7. Grooves 5, 6 extend in rectilinear fashion from rim 4a toward bottom wall 3 and terminate in a transition region 4b between side wall 4 and bottom wall 3, in which transition region 4b sink 1 has a rounded configuration. On the other hand, apex 3d of elevation 3c is flat (no groove).

Figure 7:
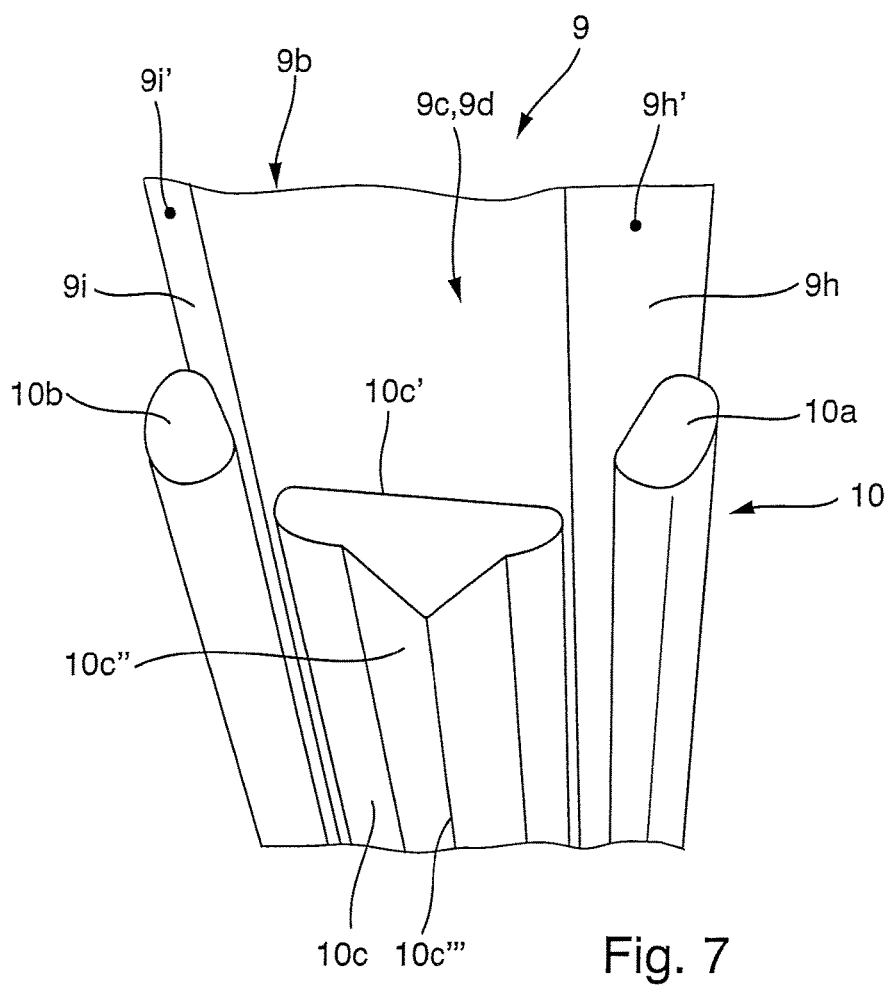
FIG. 7 is a detailed view of the peripheral edge of the divider.

FIG. 7 shows a detailed perspective view of an edge portion, e.g. edge portion 9c or 9d of divider 9. First of all, FIG. 7 shows that divider 9, along its peripheral edge 9b, can be of trapezoidal cross section, too. In any case, however, an edge cross section of divider 9 should correspond to a cross section of grooves 5, 6, as shown in FIG. 6. Furthermore, as can be gathered from FIG. 7, gasket 10 (cf. FIG. 5) is composed of three individual seal beads which are denoted 10a, 10b and 10c, respectively. A first seal bead 10a is arranged on a first lateral side 9h of said edge 9b of said divider 9, in particular in said first through third portions 9c-9e (cf. FIG. 5 above). Said first lateral side 9h is bevelled with respect to a first side wall (not shown) of the divider 9, thus generating a bevel surface (9h'), a corresponding bevel angle being preferably equal to approx. 45° (without limitation). A second seal bead 10b is arranged on a second lateral side 9i of said edge 9b of said divider 9 in said first through third portions thereof (reference numerals 9c-9e; FIG. 5). Said second lateral side 9i, too, is bevelled with respect to a second side wall (not shown) of the divider 9, thus generating a bevel surface (9i'), a corresponding bevel angle being preferably equal to said bevel angle of said first lateral side 9h, i.e., equal to approx. 45° (without limitation). As can be gathered from FIG. 7, said second lateral side 9i is facing away from said first lateral side 9h. Furthermore, there is provided a third seal bead 10c which is arranged on said peripheral edge 9b between said first and second seal beads 10a, 10b. While said first and second beads 10a, 10b are intended to contact side walls of grooves 5, 6 (cf. FIG. 6), which side walls can be shaped complementary to respective portions of the divider 9, especially with respect to said bevelled surfaces 9h', 9i', said third seal bead 10c is intended to either contact a bottom wall of grooves 5, 6 (cf. FIG. 6) or said apex 3d of elevation 3c.

As can further be gathered from FIG. 7, while said first and second seal beads 10a, 10b have an essentially circular or oval cross section, said third seal bead 10c is of different shape. According to the embodiment of FIG. 7, said third seal bead 10c has an essentially flat, rectangular base 10c', on top of which is located a protrusion in the form of a triangular prism 10c'', with its apex 10c''' facing away from said peripheral edge 9b.

Figure 8:
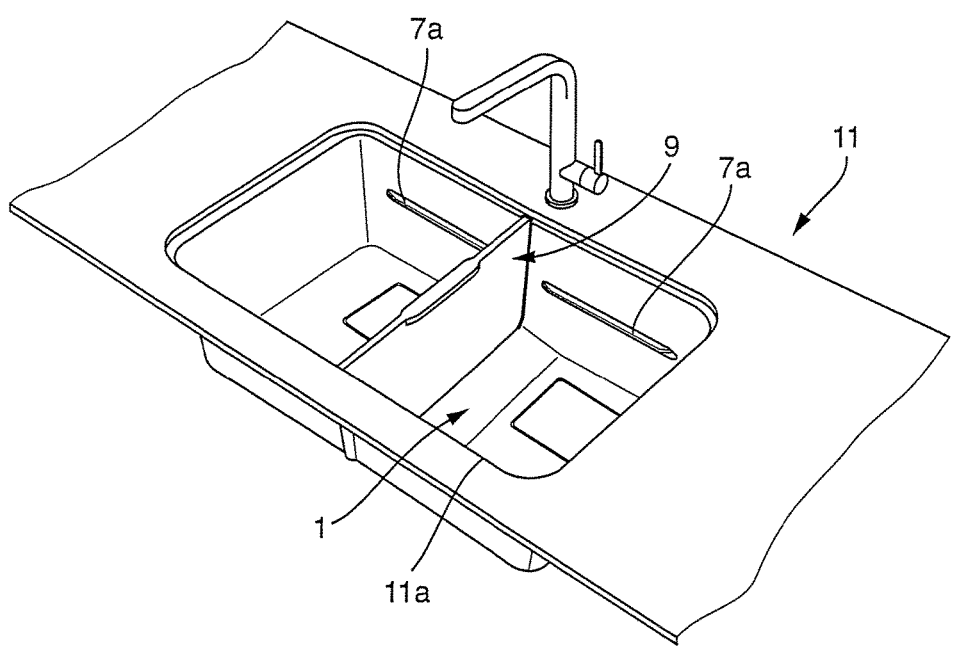
FIG. 8 is a perspective view of a sink according to the present invention, essentially according to FIG. 1 or FIG. 2, installed in a worktop.
Figure 9:
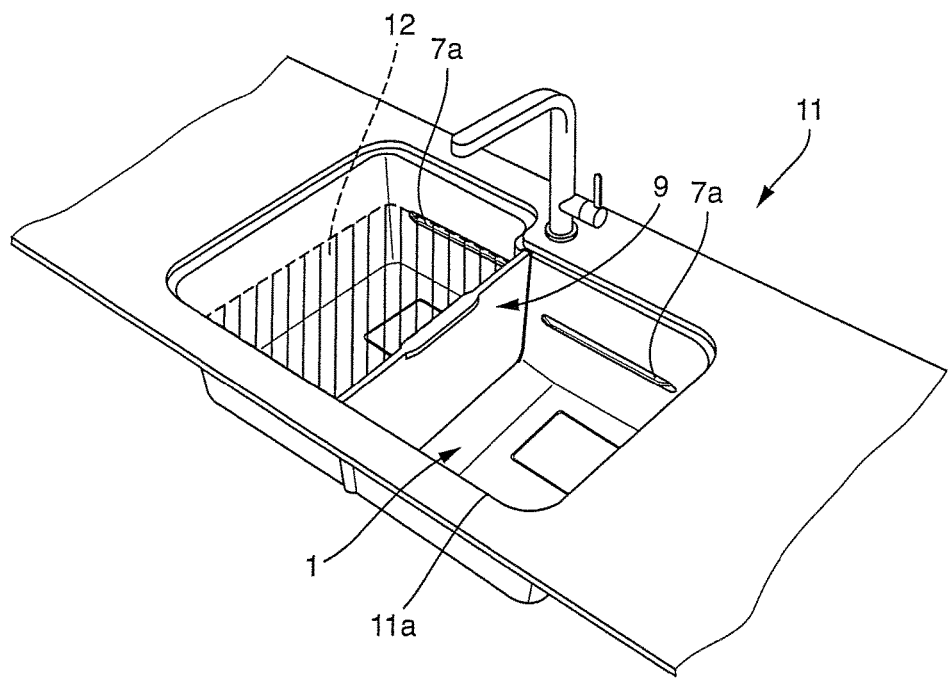
FIG. 9 is a perspective view of a sink essentially according to FIG. 3 or FIG. 4 installed in a worktop.

FIG. 8 and FIG. 9 show the sinks essentially according to FIGS. 1 and 2 and FIGS. 3 and 4, respectively, when installed in a worktop 11 with corresponding cut-out 11a. Furthermore, there is a water tap, which does not form part of the present invention.

In FIG. 9, for illustrative purposes only, a sink accessory has been schematically presented at reference numeral 12, which accessory 12 can take the form of a strainer or a cutting board (without limitation). Said accessory 12 has been placed on said first and second beads (only bead 7a shown) on one side of divider 9. Obviously, a further accessory (not shown) could be placed on the respective beads on the other side of divider 9.

In the case of sink 1 according to FIG. 8, a single, larger accessory could be placed on all of the beads, if divider 9 were not in place.

The invention claimed is:

1. A sink (1), comprising:
   at least one bowl (2) with a bottom wall (3) and a circumferential side wall (4);
   an outlet opening (3a, 3b) located in said bottom wall (3);
   a first rectilinear groove (5) in said side wall (4), said first groove (5) extending toward said bottom wall (3);
   a second rectilinear groove (6) in said side wall (4) opposite said first groove (5), said second groove (6) extending toward said bottom wall (3);
   a plate-shaped divider (9) that fits into said first (5) and second grooves (6) in watertight manner, said divider (9) having a peripheral edge (9b), a first portion (9c) of which is adapted to engage said first groove (5), a second portion (9d) of which is adapted to engage said second groove (6), and a third portion (9e) of which, located between said first (9c) and second portions (9d), is adapted to come into contact with said bottom wall (3);
   at least one gasket (10) arranged on said edge in said first through third portions (9c-9e) of the divider, said gasket (10) comprising first, second, and third seal beads (10a-10c), the first seal bead (10a) being arranged on a first lateral side (9h) of said edge (9b) of said divider (9) in said first through third portions of the divider, the second seal bead being arranged on a second lateral side (9i) of said edge (9b) of said divider (9) in said first through third portions (9c-9e) of the divider, said second lateral side (9i) facing away from said first lateral side (9b), and the third seal bead (10c) being arranged on said peripheral edge (9b) between said first (10a) and second seal beads (10b), at least in said third portion (9e) of said peripheral edge (9b);
   said third seal bead (10c) is of different shape than said first (10a) and second seal beads (10b), and is at least partially formed as a triangular prism (10c'') in cross-section with an apex (10c''') of the triangular prism facing away from said peripheral edge (9b).

2. The sink (1) according to claim 1, wherein
   said first (10a) and second seal beads (10b) have a circular or oval cross section.

3. The sink (1) according to claim 2, wherein
   the first lateral side (9h) of said edge (9b) comprises a first beveled surface that faces outwardly toward the first and second grooves, and the second lateral side (9i) of said edge (9b) comprises a second beveled surface that faces outwardly toward the first and second grooves, said first seal bead (10a) and said second seal bead (10b) being arranged on the first and second beveled surfaces (9h', 9i'), respectively.

4. The sink (1) according to claim 1, wherein
   at least the third seal bead (10c) of the gasket (10) is made of silicone.

5. The sink (1) according to claim 1, further comprising a first bead (7a) arranged in said side wall (4) in a vicinity of said first groove (5), extending orthogonally with respect to said first groove (5), and a second bead (8a) arranged in said side wall (4) in a vicinity of said second groove (6), extending orthogonally with respect to said second groove (6), said first (7a) and second beads (8a) being located on a same side of the divider (9), when said divider (9) is fitted into said first (5) and second grooves (6), and said first (7a) and second beads (8a) being located at least one of at a same distance from an upper edge (4a) of said bowl (2) or in a common horizontal plane in an installed state of the sink (1).

6. The sink (1) according to claim 5, further comprising an additional first bead and an additional second bead, wherein the additional first bead and the additional second bead are located on opposite sides of the divider (9) from the first bead and the second bead, when said divider (9) is fitted into said first (5) and second grooves (6).

7. The sink (1) according to claim 5, wherein
said first bead (7a) and second bead (8a) are adapted to support a sink accessory (12).

8. The sink (1) according to claim 7, wherein the sink accessory is a cutting board or a strainer supported on the first and second beads.

9. The sink (1) according to claim 1, further comprising an additional outlet opening in the bottom wall, wherein the additional outlet opening is located on an opposite side of the divider (9) from the outlet opening, when said divider (9) is fitted into said first (5) and second grooves (6).

10. The sink (1) according to claim 1, wherein
said divider (9) is made of a plastic or synthetic material, or of metal.

11. The sink (1) according to claim 1, wherein
said divider (9) has two distinct sides, each comprising at least one of a different material composition or a different color.

12. The sink (1) according to claim 1, wherein
said divider (9) comprises a grip or a gripping hole (9a) in proximity to a fourth portion (9f) of the peripheral edge (9b), said fourth portion located opposite said third portion (9e).

13. The sink (1) according to claim 1, wherein
said bowl (2) tapers toward said bottom wall (3), and said side wall (4) including said first (5) and second grooves (6) is inclined by 2 to 3 degrees.

14. The sink (1) according to claim 1, wherein
said bottom wall (3) has an elevated portion (3c), said elevated portion (3c) extending between said first groove (5) and said second groove (6).

15. The sink (1) according to claim 1, wherein
said divider (9) presents a complementary cross section to the first groove (5) and the second groove (6), at least along the peripheral edge (9b) in said first (9c) and second portions (9d).

16. The sink (1) according to claim 1, wherein
said bowl (2) is at least one of different shape or size on respective sides of said first (5) and second grooves (6) or on respective sides of the divider (9), when said divider (9) is fitted into said first (5) and second grooves (6).

* * * * *